(12) United States Patent
Letas

(10) Patent No.: US 8,344,532 B2
(45) Date of Patent: Jan. 1, 2013

(54) ROTOR BLADE ADJUSTMENT DEVICE FOR A WIND TURBINE

(75) Inventor: Heinz-Hermann Letas, Gross Meinsdorf (DE)

(73) Assignee: REpower Systems AG, Hamburg (DE)

( * ) Notice: Subject to any disclaimer, the term of this patent is extended or adjusted under 35 U.S.C. 154(b) by 605 days.

(21) Appl. No.: 12/600,453

(22) PCT Filed: May 14, 2008

(86) PCT No.: PCT/EP2008/003862
§ 371 (c)(1),
(2), (4) Date: Nov. 16, 2009

(87) PCT Pub. No.: WO2008/138600
PCT Pub. Date: Nov. 20, 2008

(65) Prior Publication Data
US 2010/0148506 A1 Jun. 17, 2010

(30) Foreign Application Priority Data
May 14, 2007 (DE) .......................... 10 2007 022 511

(51) Int. Cl.
*F03P 9/04* (2006.01)
(52) U.S. Cl. ........................................ 290/44; 290/55
(58) Field of Classification Search ............. 290/44, 290/55
See application file for complete search history.

(56) References Cited

U.S. PATENT DOCUMENTS

| | | | | |
|---|---|---|---|---|
| 6,870,281 B2 * | 3/2005 | Weitkamp | ...................... | 290/55 |
| 7,042,110 B2 * | 5/2006 | Mikhail et al. | .................. | 290/44 |
| 7,550,862 B2 * | 6/2009 | Altemark | ......................... | 290/44 |
| 7,581,926 B1 * | 9/2009 | Dehlsen et al. | ................. | 416/87 |
| 8,084,875 B2 * | 12/2011 | Letas | ................................ | 290/44 |
| 2008/0131279 A1 * | 6/2008 | Behnke et al. | .................. | 416/26 |
| 2010/0259045 A1 * | 10/2010 | Vilbrrandt | ........................ | 290/44 |

FOREIGN PATENT DOCUMENTS

| | | |
|---|---|---|
| DE | 102 53 811 | 6/2004 |
| DE | 103 35 575 | 3/2005 |
| DE | 10 2006 009 127 | 9/2007 |
| DE | 10 2006 027 224 | 1/2008 |

(Continued)

OTHER PUBLICATIONS

International Search Report and Written Opinion mailed Mar. 4, 2009, directed to counterpart International Application No. PCT/EP2008/003862; 10 pages.

*Primary Examiner* — Truc Nguyen
(74) *Attorney, Agent, or Firm* — Morrison & Foerster LLP (57) ABSTRACT

A wind turbine includes a rotor having adjustable rotor blades for driving a generator and an adjusting device for the rotor blades provided with an actuator that comprises at least an excitation winding. The adjusting device includes a torque-reducing device that automatically reduces drag torque of the actuator. The torque-reducing device includes a current divider that switches the current through the excitation winding in such a manner that the current flows completely through the excitation coil when the motor is in operation and the current only partly flows through the excitation coil when coasting (slip operation). As a result, when coasting, the magnetization of the excitation winding is reduced about the adjusting device, whereby the increase of the speed torque characteristic curve can be determined, thus improving the ratio of the adjusting device when coasting.

12 Claims, 4 Drawing Sheets

FOREIGN PATENT DOCUMENTS

| | | |
|---|---|---|
| EP | 1 128 064 | 8/2001 |
| EP | 1 385 261 | 1/2004 |
| EP | 1 744 444 | 1/2007 |
| GB | 2 201 309 | 8/1988 |
| WO | WO-98/06595 | 2/1998 |
| WO | WO-2006/133689 | 12/2006 |
| WO | WO-2007/144146 | 12/2007 |

* cited by examiner

ROTOR BLADE ADJUSTMENT DEVICE FOR A WIND TURBINE

REFERENCE TO RELATED APPLICATIONS

This application is a national stage application under 35 USC 371 of International Application No. PCT/EP2008/003862, filed May 14, 2008, which claims the priority of German Patent Application No. 10 2007 022 511.5, filed May 14, 2007, the contents of which prior

FIELD OF THE INVENTION

The invention relates to a wind energy installation having a rotor with adjustable rotor blades for driving a generator, an adjustment device for the rotor blades having an actuating motor which has at least one field winding, wherein the adjustment device has a torque weakening device which automatically reduces a drag torque of the actuating motor.

BACKGROUND OF THE INVENTION

Modern wind energy installations have rotors with adjustable rotor blades. The pitch angle of the rotor blades can be varied with respect to the airflow by the adjustment. The rotor blades are also adjusted in order to stop the rotor of the wind energy installation. For this purpose, the rotor blades are moved to a so-called wind bearing position. For safety reasons, the wind energy installations must be designed such that the rotor can be brought to rest quickly when required. This is done on the one hand when the wind is excessively strong, but on the other hand also when parts of the wind energy installation are believed to have failed. The rotor blades are adjusted to the safe wind bearing position in the control mode by means of the blade adjustment drive and its control system. However, it cannot be assumed for safe emergency operation that the control system is still completely available. The blade adjustment device should be designed such that the rotor blades can be moved quickly and safely to the wind bearing position even in uncontrolled emergency operation.

It has been shown that, in certain conditions during uncontrolled emergency operation, the rotor blade to be adjusted is adjusted more quickly on the basis of aerodynamic forces than the speed corresponding to that of the actuating motor. The actuating motor is then driven by the rotor blade, and acts as a generator. The current flow through the armature revolves. This so-called feedback current flows through the series winding, thus increasing the magnetization. The induced voltage rises, which can lead to a further increase in the current. Overall, this results in undesirable positive feedback, which can lead to dangerous instabilities. In particular, the load acting on the tower head of the wind energy installation changes, as a result of which oscillations can occur on the tower.

In order to prevent the occurrence of such instabilities during slip operation as well, it is known in the case of actuating motors which are in the form of compound-wound motors for the series winding to be bridged by means of a diode during slip operation. The current which is produced by the actuating motor during slip operation is short-circuited by the diode in such a way that, in a corresponding manner, no more current flows through the series winding, and the magnetization correspondingly decreases. The drag torque of the motor is thereby reduced (EP-A-1 744 444). However, it has been found that, with certain designs, particularly of compound-wound motors, the short-circuiting of the series winding leads to the torque/rotation-speed characteristic having an undesirable profile, to be precise with the increase in the torque with respect to the rotation speed being too flat. This results in the risk of overspeeding, with damage to the adjustment device.

SUMMARY OF THE INVENTION

The invention is based on the object of providing an improved adjustment apparatus for the rotor blades of a wind energy installation, which avoids the abovementioned disadvantages in a simple manner.

In the case of a wind energy installation comprising a rotor having adjustable rotor blades for driving a generator, having an adjustment device for the rotor blades with an actuating motor which has at least one field winding, wherein the adjustment device has a torque weakening device which automatically reduces a drag torque of the actuating motor, the invention provides that the torque weakening device has a current divider which switches a current through the field winding in such a manner that all the current flows through the field winding during motor operation, and only part of the current flows through the field winding during slip operation.

The invention has identified the fact that the magnetization caused by the field winding can be adjusted in a simple manner by passing part of the current through the field winding by means of the current divider, such that, on the one hand, it is possible to achieve the stability during generator operation of the actuating motor, as desired by the reduction in the magnetization, while on the other hand the magnetization can still be maintained to such an extent that an adequately large braking torque is still developed. Compared with the embodiment known from the prior art, with the field winding being bridged, this results in the desired steeper profile of the torque/rotation-speed characteristic. The invention provides the actuating motor with its own characteristic for slip operation. This allows a second, selectable characteristic to be added for slip operation, with minimal complexity, to the unchanged characteristic of the actuating motor for motor operation.

As will be described in more detail in the following text, the current divider may be formed completely from passive components. The current divider according to the invention therefore in a surprisingly simple manner links advantages relating to better stability, adequately high braking torque with very high reliability, and therefore suitability for emergency operation. This overcomes the risk of damage to the drive. Furthermore, the risk of oscillations of the tower and of the tower head is overcome, thus reducing the risk of overloading the mechanical structure. The operating safety and reliability of the installation can be considerably improved with little effort, thanks to the invention.

A number of the terms used will be explained in the following text:

The drag torque means the torque absorbed by the motor when it acts as a brake in the form of a generator.

Emergency operation means an operating mode in which no external control is required, and which may be fed from a dedicated, autonomous (direct-current) power supply. A "contact control", formed using robust components, can preferably be provided.

The current divider expediently comprises a switching element which is switched on passively during slip operation. In this case, the expression passive means that there is no need for any switching signal supplied from an external open-loop or closed-loop control system. This has the considerable advantage for emergency operation that the switching element operates autonomously. Failure of the operating control of the wind energy installation or of other control parts therefore has no influence on the operation of the current divider according to the invention.

In particular, according to the invention, it is possible to provide two ways in which the current flowing through the field winding and producing the magnetization can be split. A first way consists in that the current divider comprises a branch in parallel with the field winding, having a resistance and a switching element, which branch is switched on during slip operation. During slip operation, the field winding and the resistance are therefore connected in parallel, as a result of which the current is split between the field winding and the resistance. During normal motor operation, in contrast, the switching element is switched off, as a result of which the current is not split. Because of the parallel connection, the current flow through the field winding during slip operation is reduced in accordance with the ratio of the conductances of the field winding and of the resistance. In this case, it is possible to choose the resistance value (which is the reciprocal of the conductance) to determine what proportion of the current will flow through the field winding, and therefore to set the gradient of the torque/rotation-speed characteristic. If, by way of example, the resistance is chosen such that its conductance is of precisely the same magnitude as that of the field winding, then half of the current flows through the resistance, and the other half flows through the field winding. The current through the field winding is therefore halved, thus correspondingly reducing the magnetization and therefore the braking torque of the actuating motor. The current divider therefore provides a middle path between all of the current flowing though the field winding, which can lead to undesirable positive feedback, and short-circuiting of the field winding, which leads to an undesirably severe decrease in the braking torque.

The current divider preferably comprises the series winding and a fixed parallel resistance. The current divider can expediently be designed with a plurality of stages having at least two resistances connected in series or parallel, which are selectively connected to the switching element. The desired braking torque can therefore be stepped by appropriate choice of the values of the at least two parallel resistances, for example with two binary-stepped resistances being connected in parallel resulting in a decrease in the braking torque by 75%, 50%, or 25%, depending on which parallel resistance is connected to the switching element. The parallel resistances can in each case be connected individually to the switching element, or else they can be connected in a combined form. The latter offers the advantage that more steps are possible than the number of steps corresponding to the number of parallel resistances. For example, three different steps can be achieved using two parallel resistances, while seven different steps can even be achieved using three parallel resistances. In this case, selectable means that parallel resistances can be selected dynamically during operation, or this is implemented quasi-statically by appropriate connection of the switching elements and of the respective parallel resistances in the terminal block. In general, the latter is sufficient, since the influence on the torque/rotation-speed characteristic produced by the parallel resistances is governed by the configuration of the wind energy installation, in particular by the rotor blades and the actuating motor that is used, that is to say parameters which do not change during operation.

In particular, the use of one or more parallel resistances to form the current divider offers the advantage that these parallel resistances can also be retrofitted with little effort to already existing motors. However, this simplicity is counteracted by the disadvantage that heat losses can occur in the resistance, and must be dissipated. This can be achieved actively by cooling, although this results in additional complexity, or passively by means of sufficiently large ventilation cross sections, although this in turn restricts the usefulness of the embodiment. Since slip operation occurs only briefly during emergency operation, the resistances need not be designed for continuous operation, but only for short-term energy consumption. This disadvantage is avoided by the second embodiment of the invention.

According to the second embodiment, provision is made for the current divider for the field winding to be split into at least two winding elements, wherein the switching element bridges one or more but not all of the winding elements during slip operation. This means that current is no longer passed through at least one winding element during slip operation, and therefore that this winding element does not make any contribution to the magnetization, while the current still flows through the other or the remaining winding elements. Since the resulting total magnetization depends on the number of windings through which current flows, the magnetization is reduced corresponding to the ratio of the deactivated winding element to the winding element which remains active. The gradient of the torque/rotation-speed characteristic and therefore the braking torque during slip operation can therefore be suitably chosen. This embodiment offers the advantage that all that is necessary is to split the field winding which is present in any case. There is no need for any additional components, apart from at least one additional terminal.

The field winding can expediently be subdivided into more than two winding elements, which are selectively connected to the switching element. By way of example, the field winding, providing the number of turns that are present allows, can be subdivided into sections of 25% each, as a result of which the braking torque can be reduced by 25%, 50% or 75%, by appropriate connection to the switching element. There is virtually no additional hardware complexity for this purpose, since only appropriate intermediate taps may be provided on the field winding, and just have to be connected to a connecting terminal.

In both embodiments, that with a parallel resistance and those with a split field winding, a selection switch can be used to select the extent of the current split which should be implemented. This selection switch can be permanently set, or else may be varied during operation by the operating control of the wind energy installation, if this is advantageous for operation of the wind energy installation. The selection switch offers the advantageous that it is possible to determine during operation whether a greater or lesser current split shall be implemented by the field winding, and, correspondingly, the torque/rotation-speed characteristic should have a lesser or greater gradient. In this case, the selection switch does not necessarily need to be a separate unit but can expediently also be combined with the switching element. This results in a particularly compact embodiment, which can easily be controlled.

The invention also relates to an adjustment device for the rotor blades of a wind energy installation having an actuating motor which has at least one field winding, wherein the adjustment device has a torque weakening device which automatically reduces a drag torque of the actuating motor, wherein, according to the invention, the torque weakening device has a current divider which switches a current through the field winding in such a manner that all the current flows through the field winding during motor operation, and only part of the current flows through the field winding during slip operation. Reference is made to the above statements for a more detailed explanation.

BRIEF DESCRIPTION OF THE DRAWINGS

The invention will be explained in the following text with reference to the attached drawings, which illustrate advantageous exemplary embodiments of the invention, and in which.

DETAILED DESCRIPTION OF THE INVENTION

Figure 1:
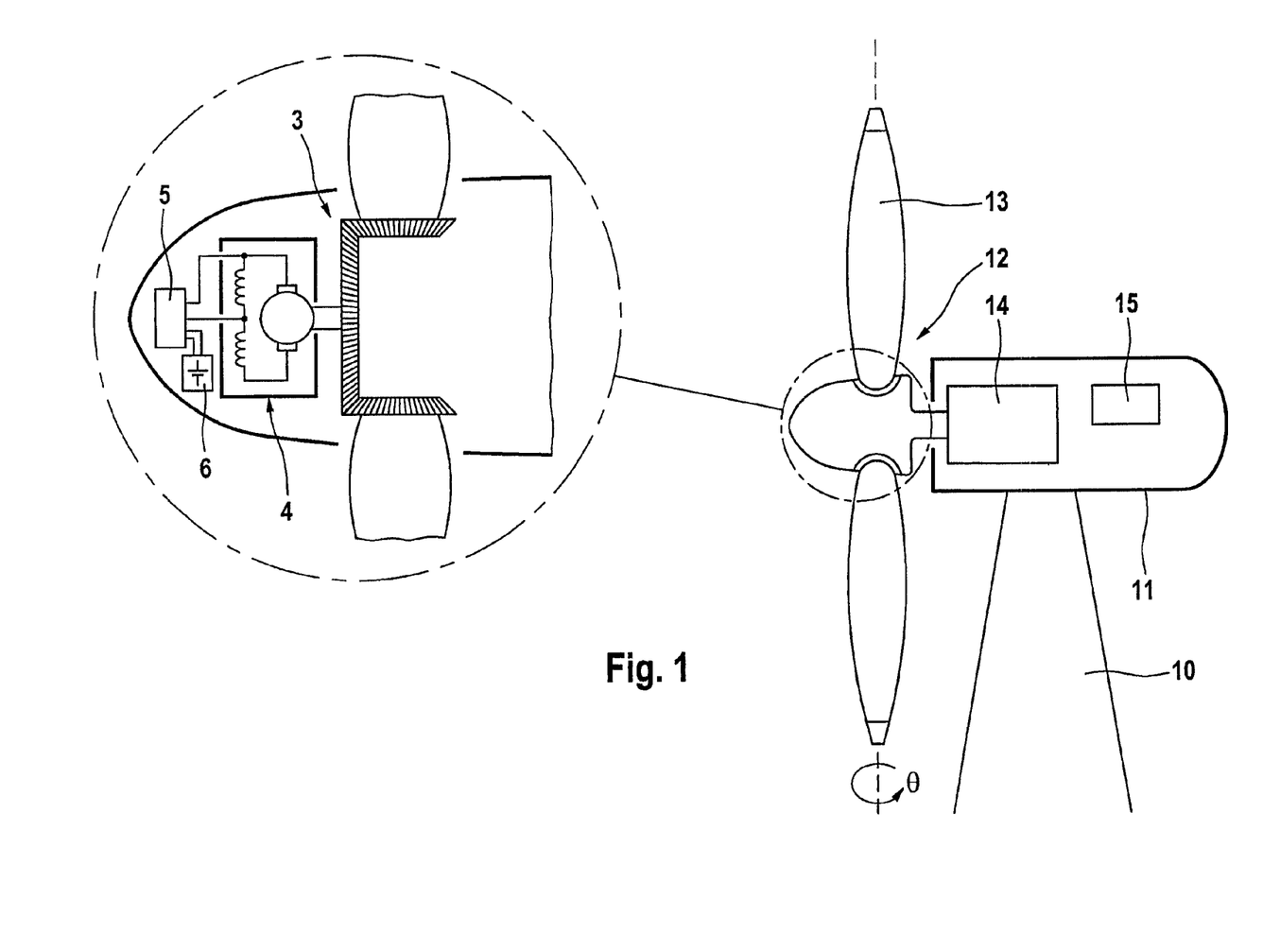
FIG. 1: shows a schematic illustration of a wind energy installation having an adjustment device.

The invention will be explained using the example of a wind energy installation having a machine housing 11 which is arranged on a tower 10 such that it can rotate in the azimuth direction and on one of whose end faces a wind rotor 12 is arranged having a plurality of rotor blades 13, whose pitch angle can be varied (two rotor blades 13 in the illustrated example), in order to drive a generator 14 in the machine housing. The electrical power produced by the generator 14 is emitted via a connection, which is not illustrated.

An adjustment device 3 is provided in order to adjust the pitch angle θ of the rotor blades 13. The figure shows an adjustment device 3 for all the blades, although individual at least partially independent adjustment devices 3 may be provided for each blade. The adjustment device 3 comprises an actuating motor 4 and a blade control module 5. The blade control module 5 operates the actuating motor 4 in order to set a nominal value, which is applied as an input signal, for the blade angle θ for the rotor blades 13. The nominal value is produced by an operating control unit 15 of the wind energy installation.

The blade adjustment device may be operated in two ways. The first operating phase is normal operation, in which the wind energy installation is operated in order to produce electrical power. Normal operation is controlled by the operating control unit 15. The other operating mode is emergency operation, in which the wind energy installation is brought to a safe operating state in certain conditions. In order to reach the safe operating state, the rotor 12 is brought to rest, and the rotor blades 13 are moved to a wind bearing position. A wind bearing position means that the rotor blades 13 assume a pitch angle of about θ=90 degrees. In order to allow emergency operation to be carried out even when there is no longer any connection to the electrical power supply system because of a fault, the wind energy installation has its own reserve energy store 6 which supplies electrical power to the adjustment device 3 even in the event of a power supply system failure. In order to ensure that the safe wind bearing position is reached even when the operating control unit 15 or the blade control module 5 has failed, the adjustment device 3 is designed such that it can autonomously move the rotor blades 13 to the safe wind bearing position. For this purpose, the actuating motor 4 is switched such that the blades 3 are moved to the wind bearing position during uncontrolled operation (so-called uncontrolled accumulator running).

The actuating motor 4 is in the form of a compound-wound motor. This comprises an armature 40, a field winding (also referred to as a series winding 41), and a shunt winding 42. The armature is in each case mechanically connected to a rotor blade 13 via an adjustment gearbox (not shown) such that the pitch angle θ is varied when the actuating motor 4 is operated.

During emergency operation, the battery 6 feeds current, which on the one hand flows via the shunt field 42 and on the other hand via a branch which is formed by the armature 40, the series winding 41 and a rectifier 7 connected therebetween. The current flowing through this branch is referred to as the armature current. To this extent, the design corresponds to a conventional adjustment device without a torque weakening device.

Figure 2:
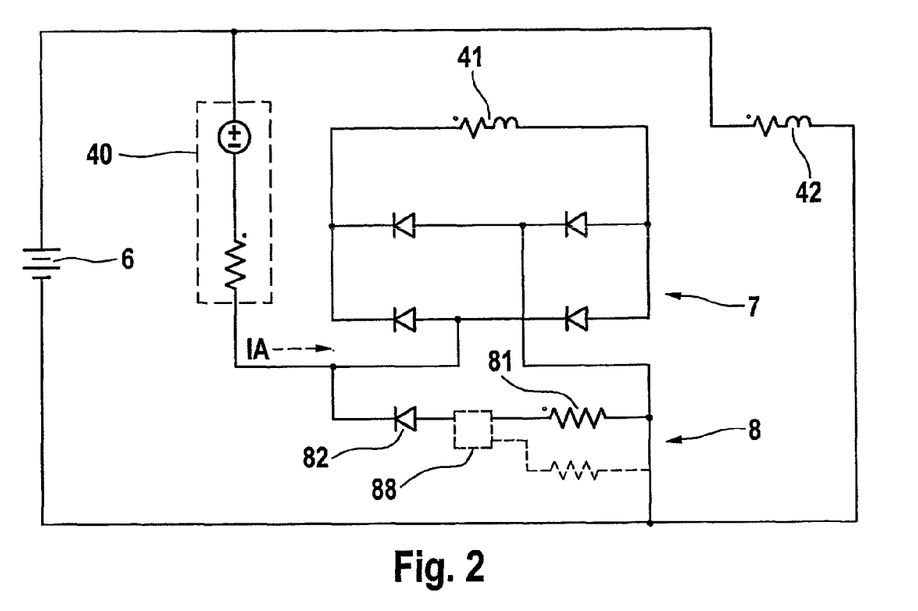
FIG. 2: shows an equivalent circuit and of an actuating motor having a torque weakening device, corresponding to a first embodiment.

A torque weakening device 8 is provided in the embodiment illustrated in FIG. 2. This comprises a parallel resistance 81 and a diode 82 as a switching element. The diode is connected such that the diode 82 is switched off as a switching element during normal motor operation with a positive armature current, so that no current flows through this branch. However, if the actuating motor 4 enters slip operation, because of aerodynamic loads acting on the rotor blade 13 to be adjusted, then the current flow direction is reversed. In this case, the diode 82 acts as a switched-on switching element, as a result of which the armature current IA no longer all flows through the series winding 41, but is split between this and the parallel resistance 81. If the parallel resistance 81 has a value which corresponds to that of the series winding 41, then the currents are distributed uniformly between the parallel resistance 81 and the series winding 41, that is to say only half the current flows through the series winding. The magnetization and therefore the drag torque of the actuating motor 4 are therefore correspondingly reduced. The resultant torque/rotation-speed characteristic and the respective armature current IA are illustrated in FIG. 6b. A considerably flatter profile can be seen, in comparison with a conventional actuating motor without a current divider, in which all the current flows through the series winding 41 even during slip operation (see FIG. 6a).

Two or more parallel resistances can optionally be provided (see the dashed illustration in FIG. 2). A selection switch 88 can be used to select which combination or combinations of parallel resistances will be connected in the parallel branch. The values of the parallel resistances are different and may expediently be chosen such that a current component of 25% (connection to the higher parallel resistance), of 50% (connection to the lower parallel resistance) or of 75% (connection to both parallel resistances) flows through the parallel branch, depending on the setting of the selection switch 88, thus allowing the braking torque and the torque/rotation-speed characteristic to be appropriately varied.

Figure 3:
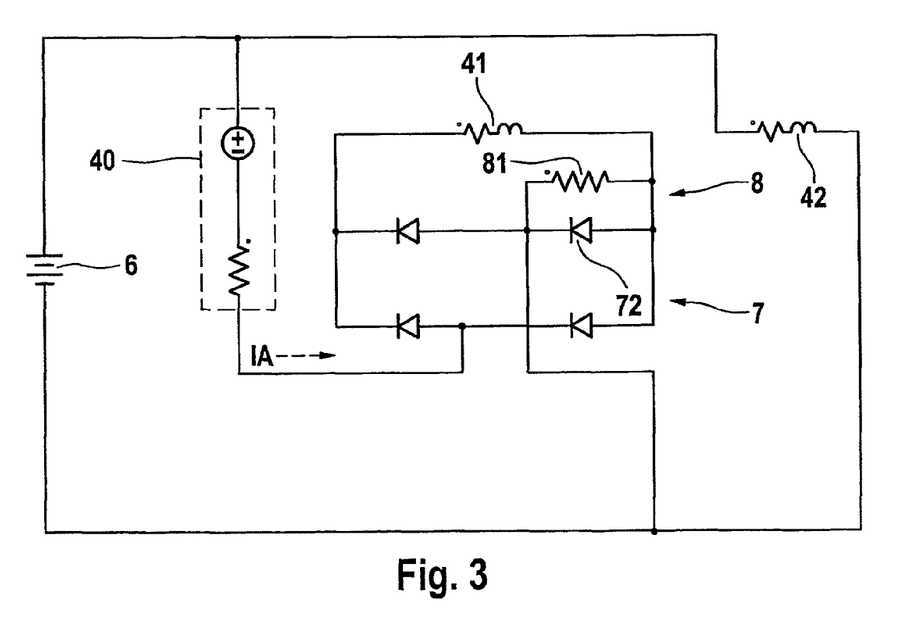
FIG. 3: shows a variant of the embodiment illustrated in FIG. 2.

FIG. 3 shows a variant of the exemplary embodiment shown in FIG. 2. Elements of the same type are provided with the same reference symbols. This differs essentially in that the parallel resistance 81 in the current divider 8 is arranged in parallel with a diode 71 in the rectifier 7. This therefore acts as a switching element for the current divider, as a result of which there is no need for a separate diode 82.

Figure 4:
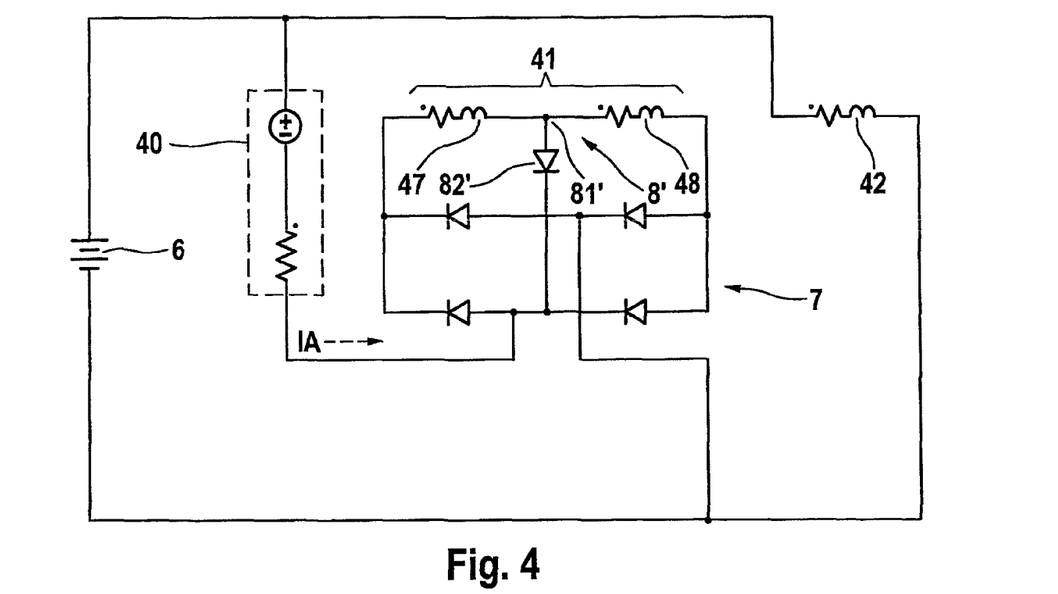
FIG. 4: shows a second embodiment of the torque weakening device and actuating motor according to the invention.
Figure 5:
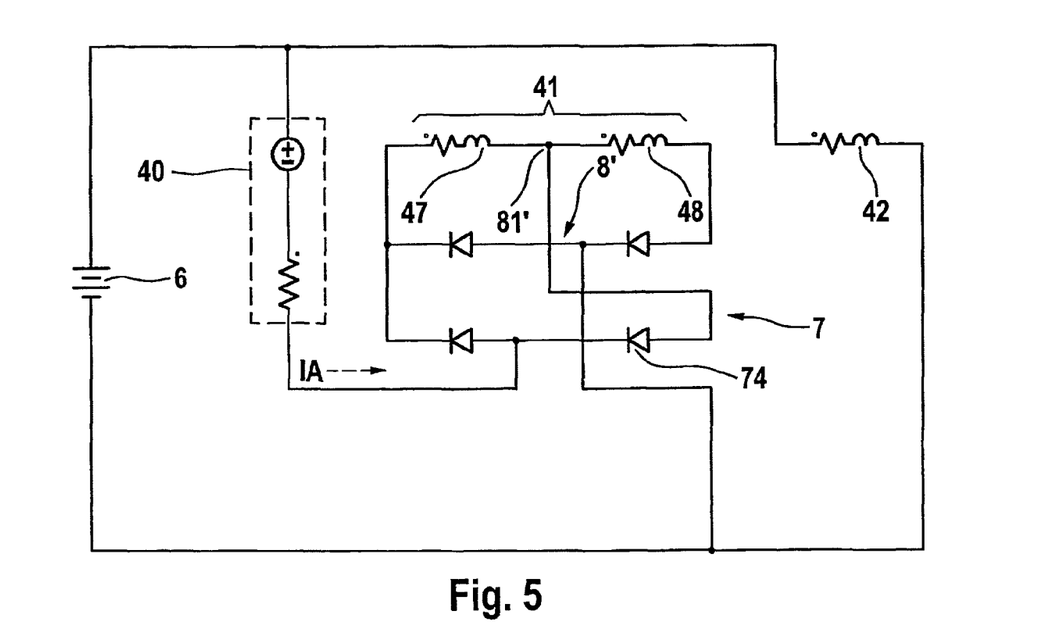
FIG. 5: shows a variant of the second embodiment as illustrated in FIG. 4.

A second embodiment of the invention will be explained with reference to FIGS. 4 and 5. The basic design with a battery 6, an actuating motor 4 with an armature 40, a series winding 41 and a shunt winding 42 corresponds to the first embodiment as described above. The current divider 8' is, however, designed differently. No parallel resistance is provided, but, instead of this, the series winding is split into two winding elements 47 and 48, with a center tap 81' being provided at the junction point between the two winding elements 47, 48. The anode of a diode 82' is connected as a switching element to this center tap, with its cathode being connected to the armature 40. During normal motor operation, the current flows through the armature winding 40 and via the rectifier 7 into the series winding 41. In this case, the diode 82' which acts as a switching element is switched off. All the armature current IA flows through the series winding 41, and the current is not split. During slip operation, in contrast, the current flow direction is reversed, as described above. The diode 82' which acts as a switching element is now switched on and bridges the winding element 48. Only part of the armature current therefore flows through the series winding, specifically only through its winding element 47. The magnetization of the series winding 41 is therefore reduced corresponding to the ratio of the number of turns of the winding elements 47, 48. In the chosen example, the two numbers of turns are the same, as a result of which the only current which flows through the field winding 41 during slip operation when the diode 82' is switched on is that which deactivates half of the winding, thus correspondingly reducing the magnetization. The drag torque of the actuating motor is correspondingly reduced. This once again results in a characteristic as is illustrated in FIG. 6*b*.

Figure 6A:
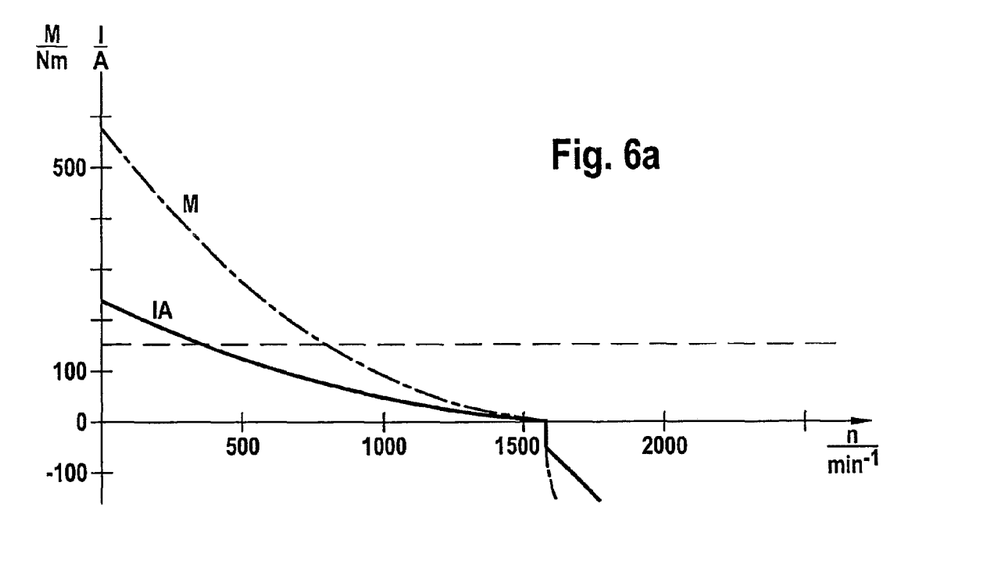
FIGS. 6a and 6b: show torque/rotation-speed characteristics.
Figure 6B:
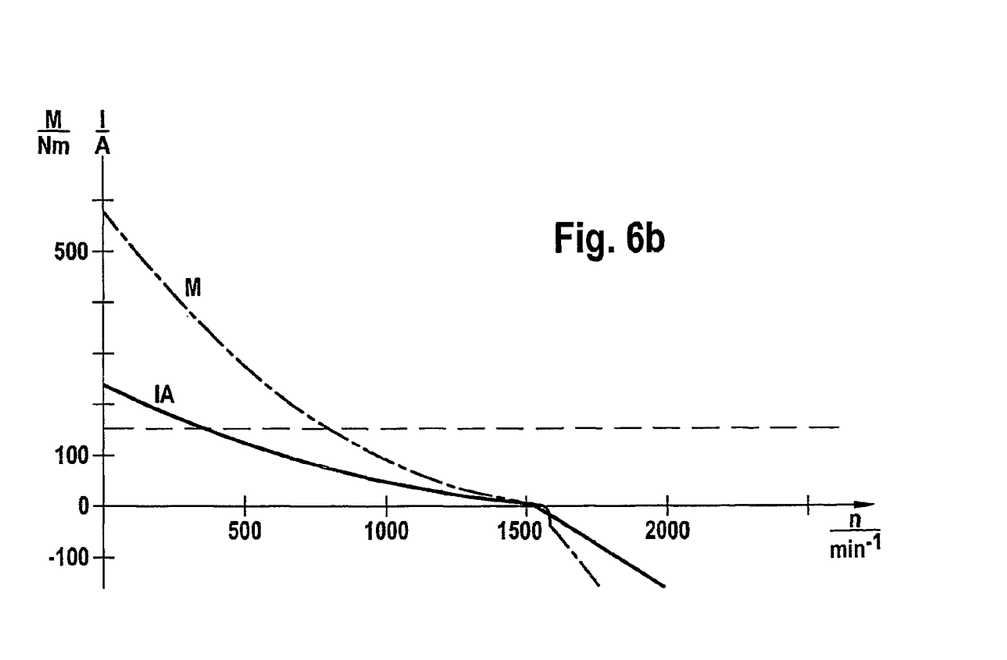

As can be seen from the comparison of the characteristics in FIGS. 6*a* and 6*b*, the characteristic which can be adjusted by the current divider according to the invention has a considerably flatter profile than that without this, but is considerably steeper than in the event of the series winding 41 being short-circuited. FIG. 5 shows a variant of the second embodiment as shown in FIG. 4. This differs therefrom essentially in that the anode of a diode in the rectifier, specifically the diode 74, is no longer connected to an end point of the series winding 41 but to the center tap 81'. This diode 74 therefore acts as a switching element for the current provider, which means that there is no need to provide a separate diode as a switching element. The statements relating to the embodiment shown in FIG. 4 apply to the method of operation.

The invention claimed is:

1. A wind energy installation comprising a rotor having adjustable rotor blades for driving a generator and an adjustment device configured to adjust the adjustable rotor blades, the adjustment device comprising (i) an actuating motor having at least one field winding and (ii) a torque weakening device configured to automatically reduce a drag torque of the actuating motor,
wherein the torque weakening device has a current divider configured to switch a current through the at least one field winding such that all of the current flows through the at least one field winding during motor operation and only part of the current flows through the at least one field winding during slip operation.

2. The wind energy installation of claim 1, further comprising a switching element configured to be switched on passively during slip operation.

3. The wind energy installation of claim 1, wherein the current divider has a branch in parallel with the field winding with a resistance and a switching element configured to be switched on during slip operation.

4. The wind energy installation of claim 3, wherein the current divider comprises a plurality of stages with a plurality of parallel resistances of different value, each of which is configured to be selectively connected to the switching element.

5. The wind energy installation of claim 2, wherein the current divider comprises a field winding divided into at least two winding elements and wherein the switching element is configured to interrupt the current during slip operation using at least one but not all of the winding elements.

6. The wind energy installation of claim 5, further comprising a plurality of winding elements configured to be selectively connected to the switching element.

7. The wind energy installation of claim 4, further comprising a selection switch configured to select one of the plurality of resistances.

8. The wind energy installation of claim 6, further comprising a selection switch configured to select one of the plurality of winding elements.

9. The wind energy installation of claim 7 or 8, wherein the selection switch and the switching element are combined.

10. An adjustment device configured to adjust rotor blades of a wind energy installation, the adjustment device comprising:
an actuating motor having at least one field winding; and
a torque weakening device configured to automatically reduce a drag torque of the actuating motor and having a current divider configured to switch a current through the at least one field winding such that all of the current flows through the at least one field winding during motor operation and only part of the current flows through the at least one field winding during slip operation.

11. The adjustment device of claim 10, comprising the current divider as claimed in one of claims 2 to 7.

12. The wind energy installation of claim 1, wherein the current divider comprises a field winding divided into at least two winding elements and wherein a switching element is configured to interrupt the current during slip operation using at least one but not all of the winding elements.

* * * * *

UNITED STATES PATENT AND TRADEMARK OFFICE
CERTIFICATE OF CORRECTION

| | | |
|---|---|---|
| PATENT NO. | : 8,344,532 B2 | Page 1 of 1 |
| APPLICATION NO. | : 12/600453 | |
| DATED | : January 1, 2013 | |
| INVENTOR(S) | : Heinz-Hermann Letas | |

It is certified that error appears in the above-identified patent and that said Letters Patent is hereby corrected as shown below:

In the Specification:

At column 1, line number 10, please add --applications are incorporated herein by reference.--

Signed and Sealed this
Ninth Day of April, 2013

Teresa Stanek Rea
*Acting Director of the United States Patent and Trademark Office*